United States Patent Office 3,250,291
Patented May 10, 1966

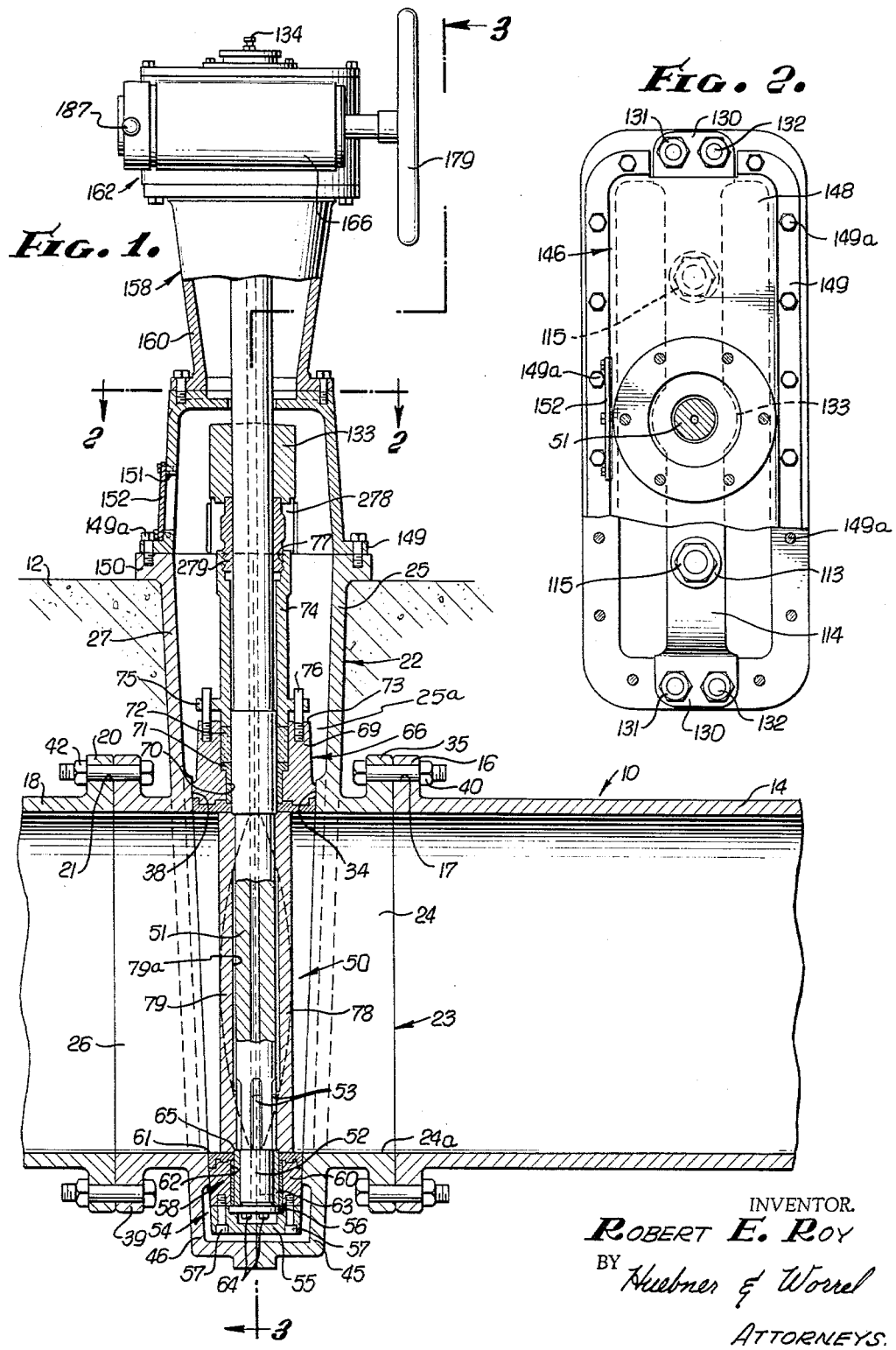

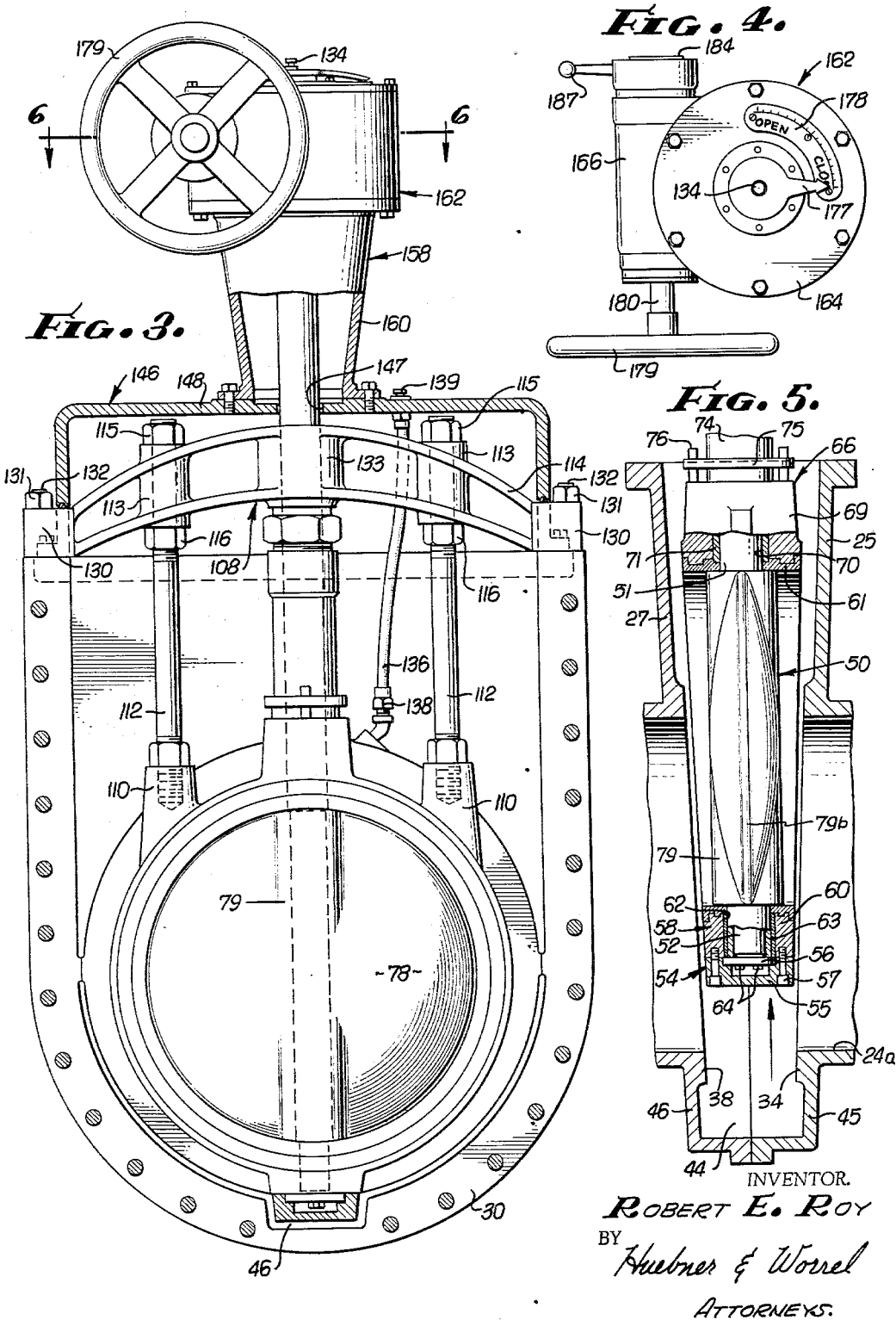

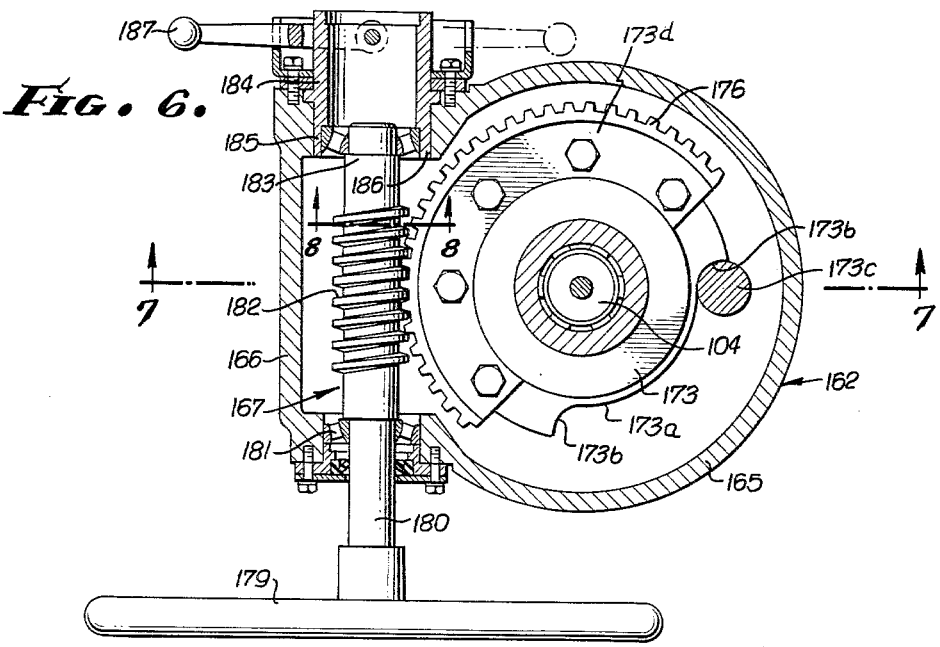
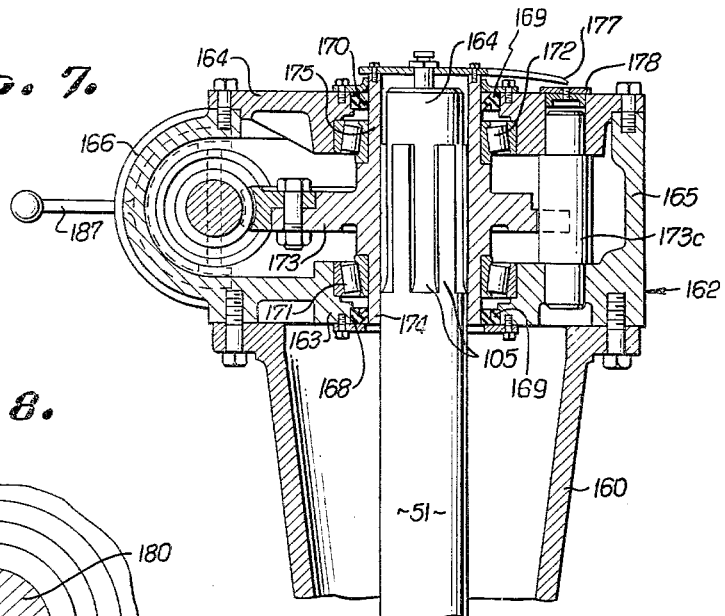
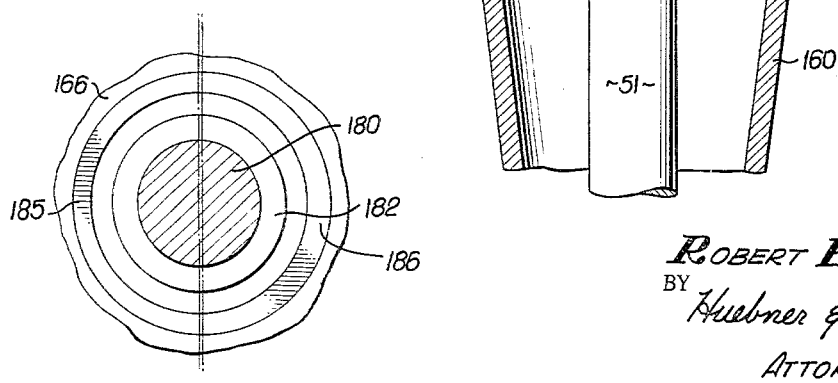

3,250,291
DEMOUNTABLE CORE VALVE
Robert E. Roy, 2371 Teviot St., Los Angeles, Calif.
Filed Sept. 27, 1963, Ser. No. 312,136
6 Claims. (Cl. 137—454.6)

This invention relates to valves which are adapted to be installed in conduits and pipe lines; more particularly, this invention relates to valves of the aforementioned type which are embedded in medium such as concrete for example. Still more particularly, this invention relates to a valve which is adapted to be installed in a conduit which is buried wherein the valve has a demountable or removable core.

The prior practice in installing valves in buried pipe lines, for example, was to install the valve in the pipe line while the pipe line was exposed, and then the pipe line including the valve was later buried, except that a portion of a valve was left exposed including suitable means for controlling the flow of fluid through the valve. The valve, once buried in the medium, had to be dug up and the pipe line cut to perform certain maintenance work upon it or to replace the valve. This has proved to be time consuming and resulted in a complete interruption of fluid flow through the pipe line.

It is therefore an object of this invention to provide a valve for use in conduits and pipes which has a removable fluid flow controlling core section.

It is another object of this invention to provide a valve for use in a pipe line or conduit which is easier and more economical to maintain than the valves of the prior art.

Still another object of this invention is to provide a valve for use in a pipe line or conduit which has a removable core section which allows the section to be removed and a new one installed with a minimum of interruption in the flow of fluid in the pipe line.

Further objects and many of the attendant advantages of the present invention will become apparent from a detailed consideration of the following parts of the specification, including the figures in which like numerals indicate like parts throughout the views, and in which:

FIGURE 1 is a side elevational view, partly in section, of the valve of the present invention located in an intended environment;

FIGURE 2 is a cross sectional view, partly in elevation, taken along line 2—2 of FIGURE 1;

FIGURE 3 is a cross sectional view, partly in side elevation, taken along line 3—3 of FIGURE 1;

FIGURE 4 is a top plan view of the valve of FIGURE 1;

FIGURE 5 is a view of a portion of the valve of FIGURE 1 showing the removable core portion thereof in the initial stages of being withdrawn from the valve body as indicated;

FIGURE 6 is a cross sectional view, partly in elevation, taken along line 6—6 of FIGURE 3;

FIGURE 7 is a cross sectional view, partly in side elevation, taken along line 7—7 of FIGURE 6; and FIGURE 8 is a cross sectional view taken along line 8—8 of FIGURE 6.

Conduit or pipe 10 is shown embedded in medium 12, such as earth or concrete for example, and is made up of a first conduit portion 14 and a second conduit portion 18. First conduit portion 14 has an annular flange 16 which is formed with bolt holes 17 generally equidistantly spaced, and likewise portion 18 has a corresponding annular flange 20 thereon which is drilled with bolt holes 21 about its periphery and generally equidistantly spaced.

Positioned between the conduit portions 14 and 18 is the demountable core valve generally designated 22. The valve 22 includes an annular hollow valve body 23 comprising a first conduit body half 24 and a second conduit body half 26. The halves 24 and 26 are each formed with upstanding outwardly inclined wall portions 25 and 27. A flange (unseen in drawings) extends around the half 24 and wall 25 and is aligned with a flange 30 which extends around the half 26 and wall 27. Each of the halves and walls are joined together by the unseen flange and flange 30 and secured by bolts 32 forming the body 23.

The hollow valve body 23 is secured to the conduit flanges 16 and 20 by bolts 40 and 42 which pass through flanges 35 and 39 of conduit body halves 24 and 26, respectively.

A fluid confining bore 24a is formed through halves 24 and 26 axially aligned with and of a diameter corresponding tot the diameter of the conduits 14 and 18.

Diametrically opposite the opening 25a formed between walls 25 and 27 on the body 23 is formed at annular valve core seat or clearance pocket 44 projecting outward therefrom. The seat is formed of outwardly tapered walls 45 and 46, respectively. The walls 45 and 46 are inclined corresponding with the taper of the walls 25 and 27 and as illustrated in FIGURE 1 are aligned with the walls 25 and 27.

A pair of annular guide shoulders or taper seats 34 and 38 are formed about the body halves 24 and 26, respectively, seen in dotted lines of FIGURE 1, and also pass through the walls 25 and 27 and are inclined or tapered within these walls. The shoulders also are continued and pass through the seat 44.

The guide shoulders 34 and 38 generally form a V as viewed in FIGURE 1.

The demountable valve core assembly generally designated 50 is adapted to be interposed within the valve body 23 to control the flow of fluid through the conduits 14 and 18.

The assembly 50 includes a rotatable shaft member 51 which is journaled within the seat 44 and extends upwardly between the walls 25 and 27 to control mechanism which will be described later. Adjacent the lower end 52 of the shaft member 51 there is provided a plurality of splines 53 which extend around the shaft member 51. The lower end 52 of the shaft is mounted in a lower bearing assembly generally designated 54 which in turn is mounted within the seat 44. The lower bearing assembly 54 includes a bottom cap 55 and a thrust washer 56 seated in the cap 55. The lower cap 55 is secured by bolts 57 to a ring seal assembly 58 which includes an annular inner section 60 and an annular outer resilient section 61. The two sections 60 and 61 are preferably tongue and grooved and vulcanized together. As will be seen in the drawings, the seal ring is tapered having a smaller width in the seat 44 than between the walls 25 and 27. The seal ring bears against the shoulders 34 and 38. The ring seal 58 is formed with diametrical spaced bores 62 and 70 opening into the seat 44 and area 25a between walls 25 and 27, respectively. This bore 62 is normally greater in diameter than the diameter of the shaft 51. Inserted within the bore 62 is a thrust bearing sleeve 63. The lower end 52 of the shaft 51 is mounted within the sleeve 63 and is held to the thrust washer 56 by means of bolts 64. The splines 53 bear against the top 65 of the bearing sleeve 63.

It should be noted that the annular exterior sides of the bottom cap 55 and the ring seal assembly 58 are tapered outwardly on the same inclination as the shoulders 34 and 38. As the assembly is lowered into position, the ring assembly 58 will engage the tapered shoulders 34 and 38; thus the assembly will seat in the proper place.

In order to further align and support the core assembly 50 there is provided an upper bearing assembly generally designated 66 between the inclined walls 25 and 27 in the region of the fluid confining passageway. This assembly 66 includes the seal ring 58 with the resilient portion 61 as previously described. The seal ring 58 extends upwardly and includes a shank extension 69. Within the bore 70 and surrounding the shaft 51 is a bearing sleeve 71 and above the bearing sleeve 71 is a packing gland 72. This gland surrounds the shaft 51 and prevents moisture from passing along the shaft member 51.

Adjacent the top 73 of the shank extension 69, the shaft 51 is encircled by a packing sleeve 74 which is adapted to fit within the bore 70 and be urged against the packing gland 72. In order to tighten the sleeve 74 an annular flange 75 is provided and the sleeve 74 is held with the seal ring 58 by means of studs 76. The opposite end of the sleeve 74 is provided with internal threads 77 which is threadably secured to a lock nut 278 having a threaded shank portion 279 which mates with the internal threads 77.

A circular leaf or disc valve member 78 has an enlarged diametrical section 79 with a bore 79a to receive the shaft 51 and the member 78 is fixedly mounted to the shaft for rotation therewith by any suitable means. The disc valve member 78 is contoured or tapered radially outward from the section 79 on both sides to its peripheral edge 79a, as best seen in FIGURE 5. Such construction, while not an essential limitation to the invention, insures the lowest resistance to fluid flow as the disc 78 is in an open position.

A valve core retaining assembly generally designated 108 is provided for holding the core assembly 50 within the valve 22. This assembly 108 is best seen in FIGURE 3. A pair of lower mounts 110 are provided on seal ring 60 within the walls 25 and 27, each having tapped holes, shown in dotted lines. Puller bars 112 are threaded at each end and each has one end threaded into the mounts 110 and the bars extend upwardly through sleeves 113 in bowed retaining beam 114. The puller bars 112 are held to the beam 114 by means of upper and lower nuts 115 and 116, respectively. Beam 114 also has end tie down portions 130, and each end portion abuts the valve body 23 and is held thereto by means of nuts 131 secured to bolts 132 which project from the walls 25 and 27. See FIGURE 2.

Intermediate the tie down portions 130, the beam 114 is formed with a bearing sleeve 133 which is mounted on the shaft 51 and bears against the lock nut 278 to retain the core assembly 50 within the body 23. It should be noted that while the beam 114 is illustrated as being bowed to effect a better downward biasing of the core, the design of the beam is not essential to the invention as long as the assembly 50 is retained in position. The sleeves 113 and nuts 115 and 116 further serve to crowd the core assembly 50 down and achieve a tight fit within the annular shoulders 34 and 38.

In order to remove the core assembly 50 and retaining assembly 108, first the nut 278 is backed off into the gland 74 so that there will be a clearance between the top of the nut 278 and the beam 114. Then the nuts 116 may be backed off and the nuts 115 tightened to crack the tapered seal. In this way the beam 114 can be loosened and the core 50 may be removed from the body 23, as illustrated in FIGURE 5, for replacement, maintenance and repair.

The lower bearing assembly 54 may be lubricated through an axial bore (unnumbered and shown in dotted lines) which extends through the shaft 51. A suitable grease fitting 134 is provided on the top of the shaft 51.

To lubricate the upper bearing assembly 66, a conduit 136 is attached by a fitting 138 to the bearing assembly 66. A grease fitting 139 is provided on the assembly which communicates with the conduit 136.

After the core assembly 50 and beam 114 have been positioned, a cover 146 may be positioned over the beam 114. The cover 146 has an opening 147 in its top 148 to receive the shaft 51. The cover provides protection for the beam 114 and support for the valve control means.

The cover member 146 has an outwardly extending flange 149 adapted to receive a plurality of bolts 149a which secure the cover 146 to the flange 150 of the walls 25 and 27. The cover member further has an access opening 151 and a cover plate 152 removable from the opening.

The rotation of the shaft 51 and disc valve 78 may be accomplished in any well known manner; however, the preferred embodiment includes gear means including anti-backlash means.

The illustrated control means generally designated 158 includes a support housing 160 mounted on the cover 146. The stem 51 passes through the cover 146 into the control means housing 162 which is mounted atop the support housing 160.

The control means housing or gear box 162 includes a bottom plate 163 and a top plate 164 and an outer circular wall 165 therebetween. An extension wall 166 is also provided on the wall 165 to receive a portion of the control means 167.

The upper end portion 104 of the shaft 51 projects through openings 168 and 170 of the respective plates 163 and 164. The openings 168 and 170 are fitted with taper roller bearings 171 and 172 to retain the shaft in proper vertical alignment and also fitted with seals 169 to prevent moisture from entering the housing 162.

The shaft 51 is journaled to a sector gear hub 173 by means of splines 105. A sector gear 173d is secured to a portion of the rim of the gear hub 173. The hub 173 is mounted within the housing 162 and generally normal to the axis of the shaft 51. Extension collars 174 and 175 on the hub 173 extend through the openings 168 and 170, respectively, between the shaft 51 and bearings 171 and 172.

In view of the fact that to be fully open the valve has only to be moved 90°, the sector gear 173d need only have teeth 176 which extend around the gear for no more than 180° as illustrated in FIGURE 6. To measure the degree of valve opening, a pointer 177 is journaled on the shaft above the top plate 164 and will move with it. The pointer 177 will register with an arcuate guide scale 178 which is mounted atop plate 164. The scale is calibrated by degrees and the degree of opening or closing of the fluid confining passageway may be visually observed.

The sector gear hub 173 is further formed with a 90° stop recess 173a having end stop walls 173b. A sector stop 173c extends between the plates 163 and 164 and rides in the recess 173a. The stop 173c will engage the walls 173b and prevent the sector gear and disc valve from moving more than 90°.

To actuate the valve, a manually operated hand wheel 179 is secured to a shaft 180 which extends into the housing extension 166 through self aligning radial thrust bearings 181. The shaft 180 is formed with a worm gear 182 which engages the teeth 176 of sector gear 173d. The end 183 of shaft 180 is journaled in an eccentric cage 184 that can be rotated 180° about the axis of the shaft 180 to prevent backlash of the sector gear 173d. The cage 184 includes a relatively thin walled section 185 and a relatively thick walled section 186 so that as it is rotated about its axis in the housing 166, it will shift radially toward the sector gear 173d.

In order to move the eccentric cage 184, a lever 187 is secured to the cage 184 and normally remains in the position illustrated in FIGURE 6. In this position, proper clearance between the worm gear 182 and sector gear 173d is maintained for relatively free movement. After the desired degree of valve opening has been effected by rotating the hand wheel 179, the lever 187 is rotated 180° to the position shown in dotted lines in FIGURE 6.

Such movement will shift the eccentric cage 184, due to the differing wall thickness, and the shaft 180 from the normal position radially toward the sector gear 173d so that the worm gear 182 and teeth 176 of the sector gear will be frictionally wedged together to prevent any noticeable backlash of the gear 173d through movement of the disc 78.

Alternatively, wheel 179 may be replaced by a suitable unit for automatic operation of the worm gear 182, if desired.

The valve body has been described as being made in halves, which is preferred for large valves, but small valves may be made of one piece body construction.

The ring seal means 58 forming the seal with the disc 78 is subject to abrasion as the disc is turned in the fluid confining passageway 24a. It is the preferred embodiment in the present invention that the ring 61 be of rubber which is vulcanized to a ring 60 of steel or other metallic substitute. Still more preferred, the portion of the steel ring 60 which abuts the rubber ring 61 is first brass plated and then the rubber ring 61 is vulcanized thereto in a mold. However, the ring 61 may be of a plastic material or any other material sufficiently resilient to form a seal and may be attached to the ring 60 by any means known in the art.

The preferred insertion of the core assembly 50 is by angular generally V shaped wedging into the valve body in order to get a more effective seal between the valve body and the core assembly; however, the ring seal 58 and the shoulders 34 and 38 can be of a straight sided parallel construction without departing from the spirit of the invention.

It will be apparent to those skilled in the art that applicant has provided a novel and new removable core assembly. It will also be appreciated that the removable core portion of the valve can be readily removed and a new core inserted, returning the valve to operation with a minimum of interruption of fluid flow through the valve. It will also be appreciated that the removable or demountable core valve of the present invention is easier and more economical to maintain than those of the prior art.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims so as to embrace any and all equivalent devices.

What is claimed is:

1. A valve adapted to be installed in a conduit comprising a valve body including a fluid confining bore adapted to be axially aligned with said conduit and extension means on said valve body adapted to project beyond said conduit, a valve core assembly removably mountable in said valve body including bearing means in said valve body and said extension means diametrically opposite one from the other, a rotatably mounted shaft journaled in and extending through said fluid confining bore and projecting through said extension means, a disc valve mounted on said shaft and pivotable about said shaft within said fluid confining bore of an exterior dimension corresponding to the fluid confining bore and adapted to regulate the flow of fluid through said bore, a retaining assembly overlying said core assembly and removably secured to said extension means to bias said core assembly downward in said valve body, means associated with said shaft beyond said extension means for imparting rotation to said shaft and pivotal rotation to said disc valve including a gear wheel mounted on said shaft, a worm gear meshing with said gear wheel and imparting rotation thereto, said worm gear being manually rotatable to effect rotation of said shaft and disc valve, and antibacklash means on said valve including a rotatable eccentric cage connected to said worm gear, said cage having a first position whereby said gears will mesh and rotate together and a second locking position whereby said worm gear will be moved toward said gear wheel to create a friction interference with said gear wheel and prevent movement of said gear wheel thereby preventing unwanted movement of said shaft and said disc valve.

2. A valve as defined in claim 1 wherein said gear wheel is a sector gear and includes stop means to limit the rotation of said gear.

3. A valve as defined in claim 1 wherein said worm gear includes a hand wheel for manually turning said worm gear.

4. A valve as defined in claim 1 wherein said means associated with said shaft for imparting rotation includes a visual scale to record the pivotal movement of said disc valve.

5. A valve adapted to be installed in a conduit comprising a valve body including a fluid confining bore adapted to be axially aligned with said conduit and extension means on said valve body adapted to project beyond said conduit, a seat well projecting from said fluid confining bore opposite said extension means and aligned therewith, a pair of spaced apart annular tapered guide shoulders formed around said fluid confining bore and extending into a portion of said seat well and said extension means, a removable valve core assembly conforming in tapered exterior dimension to the spaced apart annular tapered guide shoulders and insertable therebetween to guide and seat said core assembly within said valve body, and said valve core assembly being adapted to regulate the flow of fluid through said fluid confining bore by pivotal movement of a portion of said valve core disposed within said fluid confining bore about an axis approximately perpendicular to the axis of the fluid confining bore, and wherein said removable valve core assembly includes an annular seal ring having a diameter corresponding to the diameter of said fluid confining bore and being diametrically tapered whereby said seal ring will fit within said guide shoulders and be seated therein, a rotatable mounted shaft extending diametrically through said fluid confining bore, said shaft having an end extending through said seal ring and into said seat well, and another portion journaled in an opposite portion of said seal ring and said extesion means and projecting beyond said extension means, valve means mounted on said shaft within said seal ring having a diameter substantially equal to the diameter of said seal ring, and means for rotating said shaft whereby said valve means may be pivotally moved relative to the flow of fluid through said conduit to regulate said flow.

6. A valve as defined in claim 5 wherein said valve means is a circular plate having a diametrical section greater in thickness than the diameter of said shaft and being tapered radially outward from said diametrical section forming a relatively narrow peripheral edge.

References Cited by the Examiner

UNITED STATES PATENTS

| 1,072,282 | 9/1913 | Waninger | 74—405 X |
| 1,763,865 | 6/1930 | Rocke | 74—425 |
| 2,325,802 | 8/1943 | Schmidt | 251—89 X |
| 2,649,769 | 8/1953 | Kaiser | 137—368 |
| 2,730,119 | 1/1956 | Bredtschneider | 137—454.2 X |
| 2,809,662 | 10/1957 | Ray | 137—614.17 |
| 2,936,778 | 5/1960 | Stillwagon | 137—454.6 |
| 3,064,938 | 11/1962 | Knox | 251—249.5 X |
| 3,064,940 | 11/1962 | Anderson | 137—556.3 X |
| 3,179,121 | 4/1965 | Bredtschneider | 137—454.6 |

FOREIGN PATENTS

| 1,083,611 | 6/1960 | Germany. |

ISADOR WEIL, *Primary Examiner.*

H. WEAKLEY, *Assistant Examiner.*